United States Patent [19]

Thiel et al.

[11] 4,383,072

[45] May 10, 1983

[54] VULCANIZABLE RUBBER MIXTURE

[75] Inventors: Klaus Thiel, Lindau; Roland Stecher, Rehlings; Jochen Schnetger, Lindau, all of Fed. Rep. of Germany

[73] Assignee: Metzeler Kautschuk GmbH, Munich, Fed. Rep. of Germany

[21] Appl. No.: 303,092

[22] Filed: Sep. 17, 1981

[30] Foreign Application Priority Data

Sep. 19, 1980 [DE] Fed. Rep. of Germany ....... 3035510

[51] Int. Cl.$^3$ ............................................. C08L 61/10
[52] U.S. Cl. .................................. 524/432; 524/509; 524/511; 525/133
[58] Field of Search ................ 525/133, 215; 524/432, 524/509, 511

[56] References Cited

U.S. PATENT DOCUMENTS 3,717,600  2/1973  Dalhuisen et al. .................. 525/215

FOREIGN PATENT DOCUMENTS 50-66938  5/1980  Japan .
1073851   6/1967  United Kingdom .

Primary Examiner—Theodore E. Pertilla

Attorney, Agent, or Firm—Herbert L. Lerner; Laurence A. Greenberg

[57] ABSTRACT

A vulcanizable rubber mixture for producing a leather-hard rubber, which mixture is suitable for use in making a composite profile produced by simultaneous extrusion and vulcanization of two different grades of rubber. The composite profile has a region of leather-hard rubber which serves as the clamping part, and a second zone made integrally therewith, of ordinary soft, rubber-elastic rubber. The vulcanizable rubber mixture for producing a leather-hard mixture contains 20 to 40 parts by weight of polar rubber, i.e. rubber which splits off acid groups under vulcanizing conditions, e.g. polychloroprene, and 60 to 80 parts non-polar rubber, i.e. will not split off said groups, e.g. nitrile rubber, 15 to 50 parts phenolformaldehyde reinforcement resin, 0.5 to 4 parts hexamethylene tetramine, and 0.5 to 3 parts sulfur. Conventional accelerators and zinc oxide are added. Excessive pore formation during the vulcanizing is repressed by the addition of the polar rubber which splits off acid groups under vulcanizing conditions. Other excellent properties are increased toughness in cutting and stamping, reduced splintering, low shrinkage, good injectability, and insignificant production of sulfur dioxide.

3 Claims, No Drawings

VULCANIZABLE RUBBER MIXTURE

BACKGROUND OF THE INVENTION

1. Field of the Invention

The invention relates to a vulcanizable rubber mixture for producing a leather-hard rubber containing a polymer base, sulfur, phenolformaldehyde reinforcement resin, accelerators and zinc oxide.

2. Description of the Prior Art

As is explained in German Utility Model No. 7 510 829, such a rubber mixture can be used for making a so-called composite profile which is made by simultaneous extrusion and vulcanization of two different grades of rubber. This composite profile has a region of leather-hard rubber which serves as the clamping part, and a second zone made integrally therewith, of ordinary soft, rubber-elastic rubber.

A vulcanizable rubber mixture for making such a leather-hard rubber in which 12 to 40 parts sulfur are used has been proposed. A disadvantage in the processing of such rubber mixture is that an exactly defined degree of heating from the machine side must be maintained accurately. Even the smallest deviations bring about an embrittlement and splintering of the leather-hard rubber and thereby, the clamping zones of the composite profile themselves, so that problems arise in punching and cutting the composite profile. In addition, sulfur dioxide is produced in the manufacture and processing of this mixture, creating a heavy disagreeable smoke.

SUMMARY OF THE INVENTION

It is, therefore, an object of the invention to provide a vulcanizable rubber mixture of the kind mentioned above, in which the above-mentioned problems do not arise. In particular, a vulcanizable rubber mixture is provided which leads to leather-hard rubber with increased toughness and sufficient hardness so that the composite profile can readily be cut and punched and, therefore, no splintering occurs in the clamping zone.

With the foregoing and other objects in view, there is provided in accordance with the invention a vulcanizable rubber mixture for producing leather-hard rubber, comprising
 (a) 100 parts by weight polymer base with
 (b) 20 to 40 parts by weight polar rubber which under vulcanizing conditions splits off acid groups,
 (c) 15 to 50 parts by weight phenolformaldehyde reinforcement resin,
 (d) 0.5 to 4 parts hexamethylene tetramine, and
 (e) 0.5 to 3 parts sulfur.

Other features which are considered as characteristic for the invention are set forth in the appended claims.

Although the invention is illustrated and described herein as embodied in a vulcanizable rubber mixture, it is nevertheless not intended to be limited to the details shown, since various modifications may be made therein without departing from the spirit of the invention and within the scope and range of equivalents of the claims.

The invention, however, together with additional objects and advantages thereof will be best understood from the following description.

DETAILED DESCRIPTION OF THE INVENTION

In accordance with the invention, the vulcanizable rubber mixture for producing leather-hard rubber contains the following components:
 (a) 100 parts by weight polymer base with
 (b) 20 to 40 parts by weight polar rubber which splits off acid groups under vulcanizing conditions,
 (c) 15 to 50 parts by weight phenolformaldehyde reinforcement resin,
 (d) 0.5 to 4 parts by weight hexamethylene tetramine, and
 (e) 0.5 to 3 parts by weight sulfur.

The advantages achieved with the inventions are based on the following mode of operation: The leather-hard region is not produced by a hard rubber-like mixture, but by means of a cross-linkable phenolformaldehyde reinforcement resin, hexamethylene tetramine being used as the cross-linking agent. Ordinarily, excessive pore formation occurs if cross-linkable reinforcement resins with a phenolformaldehyde base are used for pressure-less vulcanization. This excessive pore formation is caused by the splitting-off of ammonia in the reaction of the phenolic resin with the cross-linking agent during the heating process during the vulcanizing.

This pore formation is now repressed in accordance with the invention, by the addition of a polar rubber which splits off acid groups under vulcanizing conditions; these acid groups catalytically accelerate the resin cross-linking so rapidly that appreciable pore formation no longer takes place. The profiles produced can be called substantially porefree, which makes it possible to make dimensionally very accurate profiles. The leather-hard clamping region of the vulcanized profiles exhibits increased toughness in cutting and stamping, while the hardness is sufficient to prevent splintering, especially in the clamping zone. In addition, these profiles shrink very little after thermal aging. Tests show that after a 16-hour heat aging at 90° C., the shrinkage is only 0.1 to 0.3%. The use of a relatively large share of phenolformaldehyde reinforcement resin leads to very good injectability of the rubber mixture. Since known vulcanizing systems can be used, the degree of heating can be maintained by the available machine technology. And, finally, no significant amount of sulfur dioxide is produced, thereby preventing the above-mentioned disagreeable smoke development.

Examples of the polymer base are natural or synthetic rubbers such as caoutchouc, butadiene rubber and preferably acrylonitrile rubber. Chlorine-sulfonated polyethylene or chlorinated polyethylene, alone or in admixture may be used as the polar rubber. The preferred proportions of rubbers are 20 to 40 parts by weight of polar rubber, i.e. rubber which splits off acid groups under vulcanizing conditions, preferably polychloroprene, and 60 to 80 parts by weight non-polar rubber, i.e. will not split off acid groups, preferably acrylonitrile rubber.

The invention will be explained in greater detail with the aid of an embodiment example.

A preferred embodiment of the rubber mixture according to the invention contains the following components:
 20 to 40 parts by weight polychloroprene
 60 to 80 parts by weight acrylonitrile rubber
 90 to 110 parts by weight carbon black 25 to 40 parts by weight novolak
16 to 20 parts by weight softener
1 to 2 parts by weight stearic acid
5 to 20 parts by weight chalk
1 to 2 parts by weight antiaging agent
4 to 8 parts by weight wax
1 to 2 parts by weight magnesium oxide
1.5 to 3 parts by weight hexamethylene tetramine
4 to 8 parts by weight zinc oxide
6 to 10 parts by weight drying agent
1 to 2 parts by weight tetramethylthiuram monosulfide as thiuram accelerator
1 to 2 parts by weight sulfur
0.3 to 1.5 parts by weight dibenzothiazyldisulfide (MBTS) as mercapto accelerator The polychloroprene can also be replaced if required by chlorosulfonated polyethylene or chlorinated polyethylene.

A novolak is used which can be obtained from Hoechst AG under the designation "Alnovol VPN 16". This substance has a melting point of 80° to 90° C. as measured by the capillary method according to DIN 53181, a dynamic viscosity of 600 to 1000 at 20° C. (cP) (mPas) as measured according to DIN 53177, in a 50-% mixture with ethylene glycol and a density of 1.1 g/ml at 20° C.

This rubber mixture was extruded together with the rubber mixture for the soft rubber and was then vulcanized as a composite profile. The vulcanizing was performed, first, in a first hot-air channel which was kept at 200° C. and then in a second hot-air channel which was likewise kept at 200° C., and finally, in an UHF channel which was at an ambient temperature of 180° C. The energy was supplied to the UHF channel by three magnetrons which require a current of 0.3 to 0.4 ampere. The travel velocity of the composite profile in the vulcanizing line was 10 meters/minute.

After passing through the vulcanizing channels, the composite profile was cooled down in shock-fashion to a relatively low temperature in the order of 20° to 40° C.

We claim:

1. Vulcanizable rubber mixture for producing a leather-hard rubber, which mixture is suitable for use in making a composite profile produced by simultaneous extrusion and vulcanization of two different grades of rubber, comprising
    (a) 60 to 80 parts by weight acrylonitrile rubber which under vulcanizing conditions will not split off acid groups,
    (b) 20 to 40 parts by weight polar rubber selected from the group consisting of polychloroprene, chlorosulfonated polyethylene, chlorinated polyethylene and mixtures thereof, which under vulcanizing conditions will split off acid groups,
    (c) 15 to 50 parts by weight phenolformaldehyde reinforcement resin,
    (d) 0.5 to 4 parts by weight hexamethylene tetramine, and
    (e) 0.5 to 3 parts by weight sulfur.

2. Rubber mixture according to claim 1, wherein accelerators and zinc oxide are admixed in the following proportion:
    (f) 1 to 5 parts by weight accelerator, and
    (g) 4 to 15 parts by weight zinc oxide.

3. Rubber mixture according to claim 1 or claim 2, wherein the phenolformaldehyde resin is a novolak.

* * * * *